Oct. 30, 1923.  
O. R. RADER  
1,472,438  
AUXILIARY WATER VAPOR AND AIR VALVE FOR INTERNAL COMBUSTION ENGINES  
Filed Sept. 19, 1921
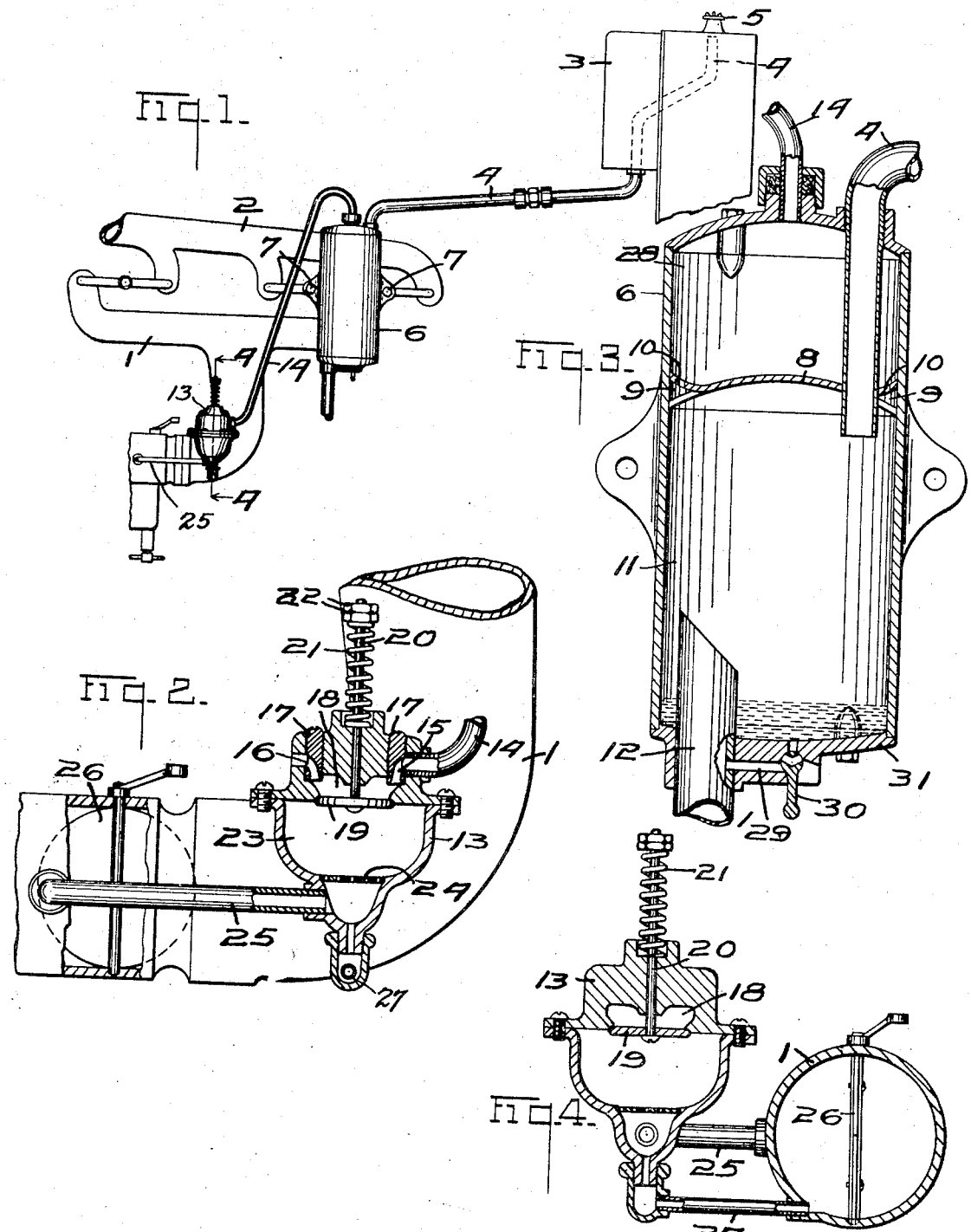

Patented Oct. 30, 1923.

1,472,438

UNITED STATES PATENT OFFICE.

ORTON R. RADER, OF TOLEDO, OHIO.

AUXILIARY WATER VAPOR AND AIR VALVE FOR INTERNAL-COMBUSTION ENGINES.

Application filed September 19, 1921. Serial No. 501,779.

*To all whom it may concern:*

Be it known that I, ORTON R. RADER, a citizen of the United States, and a resident of Toledo, in the county of Lucas and State of Ohio, have made an Invention Appertaining to Auxiliary Water Vapor and Air Valves for Internal-Combustion Engines; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a simple and efficient means that may be made at a low cost of production for directing a mixture of air and water vapor into the intake manifold of a gasolene engine. The invention particularly has for its object to provide a means whereby a true water vapor may be formed at a temperature that will prevent over saturation when directed into an internal combustion engine and in amounts mixed with air, that will vary according to the richness of the fuel mixture directed to the engine, and the rate of rotation produced in the crank shaft by the pistons of the engine.

The invention may be contained in structures of different forms and to illustrate a practical application of the invention I have selected a structure as an example of such structures containing the invention and shall describe it hereinafter. The structure selected is illustrated in the accompanying drawings.

Figure 1 of the drawings illustrates the invention as applied to an engine and shows the parts to which it is connected. Fig. 2 is a sectional and broken view illustrating the air and vapor inlet valve. Fig. 3 illustrates a container from which water vapor is fed to the part illustrated in Fig. 2. Fig. 4 is a sectional view taken on the line 4—4 indicated in Fig. 1.

1, Fig. 1, is the intake manifold and 2 is the exhaust manifold of an internal combustion engine commonly used in connection with an automobile. 3 is the radiator of an automobile having in place of the usual overflow pipe, a pipe 4 that is open at its upper end and near the upper end of the radiator. In other respects the radiator is closed by means of a cap, such as cap 5. The overflow that occurs when the radiator is filled too full and the overflow and vapor that is caused by the boiling of the water from the heat of the engine passes down through the pipe 4 into the container 6. The container 6 is secured by suitable bolts 7 to the side of the engine and in close contact or relation with the cylinders of the engine. The upper end of the container 6 is placed in contact or in close proximity to the exhaust manifold 2, and thus the container is heated by the engine.

The container 6 is provided with the partition or baffle 8 having small openings 9 formed by tongues 10 being cut from the partition 8 and being turned upward at a slight angle. The wall 8 is lens-shaped to permit it to be distended slightly to secure it in position in the manner well known in the art. This divides the container 6 into two chambers.

The pipe 4 extends through the partition into the lower chamber 11 of the container. The pipe 12 extends a short distance through the bottom 13 of the container so as to maintain the level of the water in the container that passes over from the radiator at a low point. If desired, the bottom may be provided with a small cock 14 and a passageway 15 for emptying the container 6. If the water passes over through the pipe 4 into the container as a vapor it may pass up through the upper chamber 28. The partition 8, however, prevents anything but vapor from passing up into the chamber 28. Moreover the chamber 28 is located in the vicinity to the exhaust pipe 2 that heats the vapor that may rise into the chamber 28.

The top of the chamber 28 is connected to the shell or valve casing 13 by means of the pipe 14. The shell 13 is provided with a water vapor inlet 15 with which the pipe 14 communicates. The shell 13 is also provided with an air inlet 16. The area of the water vapor inlet and the air inlet may be controlled by the screw members 17 that may be turned slightly to the right or to the left to regulate the area of the inlets.

The air inlet and the water vapor inlet are connected together by the chamber 18 within the shell. The chamber 18 is closed by means of the spring-pressed valve 19 that seats upon the portion of the shell that surrounds the chamber 18. The valve 19 is provided with a stem 20 and a spring 21 is located intermediate the shell 13 and a pair of nuts 22 that are threaded onto the stem 20. The spring 21 operates to seat the valve 19 and to close the chamber 18. The shell 13 is provided with a chamber 23 and connection between the chambers 18 and 23 is established or closed by a movement of the valve 19. If desired, a sieve or reticulated member 24 may be located in the bottom of the chamber 23 to prevent dust from passing out of the shell 13.

The chamber 23 of the shell 13 is connected to the intake 1 of the gas engine by means of the pipe 25 which connects the chamber with the interior of the intake of the gas engine at a point on the outside of the butterfly valve 26 commonly used in connection with automobile engines and by a pipe 27 that is connected with the intake of the engine between the butterfly valve and the ports or inlets of the engine. The pipe 25 has a diameter two or three times as great as the pipe 27 so as to restrict the supply of air and vapor to the engine except when the butterfly valve is wide open.

Air will enter through the air inlet 16 and vapor will enter the inlet 15 as the valve 19, which is regulated by the tension of the spring 21, is opened more or less. They will mix together and pass through the pipes 25 and 27 into the inlet intake manifold of the automobile engine whereby the engine will run smoothly and receive in addition to the water vapor a supply of air mixed with the vapor according to the speed at which the crank shaft is driven.

I claim:—

1. In a means, including vapor flow control means for supplying vapor to the intake of an internal combustion automobile engine, a container connected to the overflow pipe of the radiator of the engine and having a baffle plate located within the container and at a point substantially midway between the top and the bottom of the container, the overflow pipe connection extending to a point below the baffle plate, a combined air inlet and overflow pipe for said container, and means connecting the container with the intake manifold of an engine.

2. In a means, including vapor flow control means for supplying vapor to the intake of an internal combustion automobile engine, a container connected to the overflow pipe of the radiator of the engine and having a baffle plate located within the container and at a point substantially midway between the top and the bottom of the container, the overflow pipe connection extending to a point below the baffle plate, a combined air inlet and overflow pipe for said container and having its end terminating at a point midway between the baffle plate and the bottom of the container, the end edge of the overflow pipe of the container being located at an angle to permit the entrance of air into the container upon the overflow of the container, means connecting the container with the intake manifold of the engine.

In testimony whereof I have hereunto signed my name to this specification.

ORTON R. RADER.